Oct. 8, 1957     E. R. BRYAN     2,808,868
ANTISKID DEVICE FOR VEHICLE WHEELS
Filed March 17, 1955
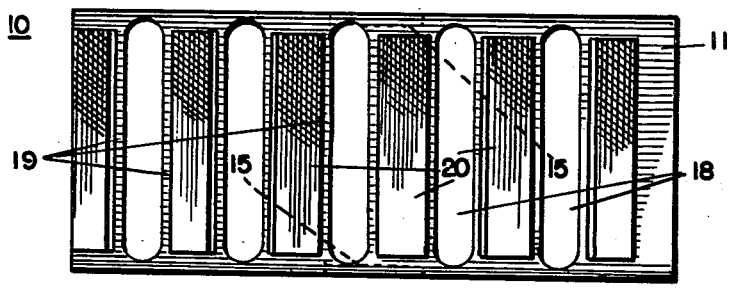
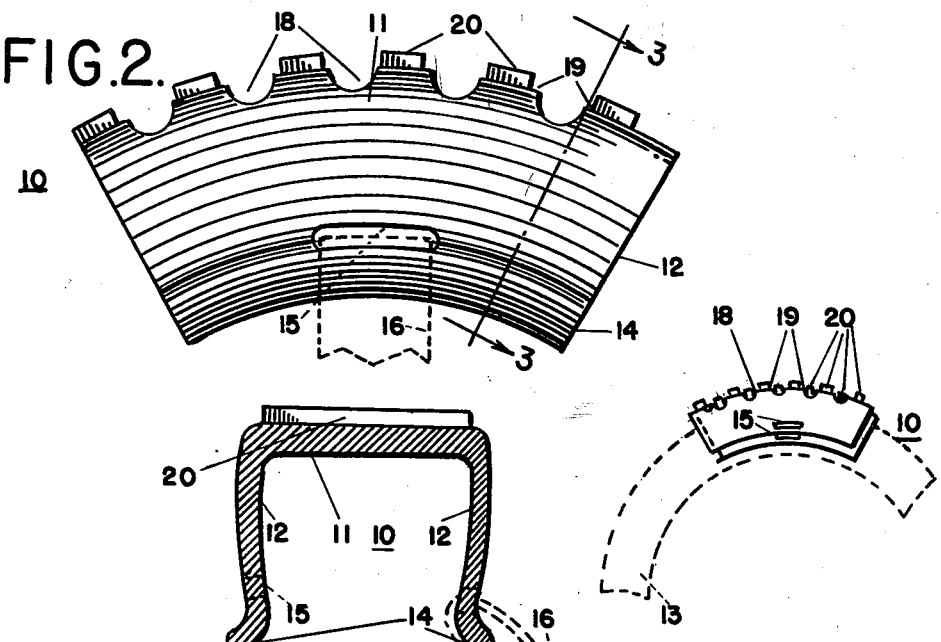
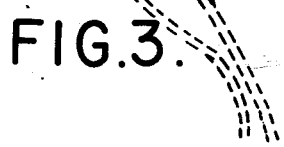
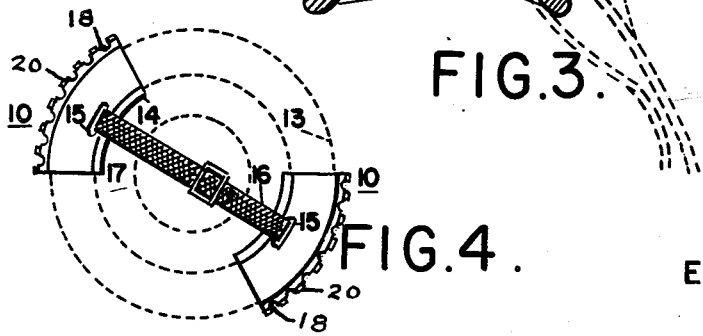
INVENTOR.
EDWARD R. BRYAN.
BY Howard J. Whelan.
ATTORNEY

United States Patent Office 2,808,868
Patented Oct. 8, 1957

2,808,868

ANTISKID DEVICE FOR VEHICLE WHEELS

Edward R. Bryan, Baltimore, Md.

Application March 17, 1955, Serial No. 494,951

1 Claim. (Cl. 152—228)

This invention relates to boots for vehicle tires and more particularly to those intended for increasing traction and the prevention of skidding.

There are a number of devices for increasing the traction of vehicle tires developed, manufactured and made available commercially. Most of these devices are subject to the objection of being hard to apply; become easily detached and lost; are worn out too readily and increase the hazards of tire use and more or less become loose, causing frictional wear, or involve difficulties in attachment. The device embodying this invention anticipates these disadvantages, by providing a boot applicable to the exterior of a vehicle wheel and pneumatic tire expeditiously. It fastens there tightly, and is designed for extended use. This is accomplished by having the boot made of thin but strong resilient material bent to conform with and bind on the peripheral and outer surfaces of a vehicle tire. In addition it includes crossbands to reinforce its traction and wear capacities. It can be attached readily and when in place remains practically immovable, and internal-wear-avoiding.

The objects of the invention intend the provision of a new and improved tire boot that will avoid one or more of the disadvantages and limitations of the prior art.

Another object of this invention is to provide a new and improved vehicle tire boot that can be readily attached and when placed in position adheres relatively immovably on the tire.

A further object of this invention is to provide new and improved traction tire boots that will permit a laminating arrangement to be made with them by superimposing one on the other.

An additional object of the invention is to provide a new and improved traction device for a pneumatic vehicle tire that will include a plurality of boots of formed sheet material adapted to resiliently snap on a tire in sets and cooperate to add substantial traction and wearing qualities to the tire.

Other objects of the invention will be apparent as it is outlined in more detail.

For a better understanding of the invention and the objects thereof, reference is made to the accompanying drawings, wherein a particular form of the invention is illustrated, while the following description explains the details of construction and important features.

Referring to the drawings:

Figure 1 is a plan view of a traction boot for application to a conventional pneumatic vehicle tire, embodying this invention;

Figure 2 is a side elevational view of one of the boots;

Figure 3 is a sectional view taken on line 3—3 of Figure 2;

Figure 4 is a diagrammatic view of the boots embodying this invention as applied in sets of two to a conventional pneumatic tire; and Figure 5 is a diagrammatic view indicating the laminated application of the boots to a pneumatic tire.

Similar reference characters refer to similar parts throughout the drawings.

In the drawings is shown a traction boot 10 preferably made of thin rustless spring steel plate bent to the form as indicated. Other materials can be employed instead, but to illustrate the invention, the use of rustless steel has been selected as especially appropriate. The boot consists of a shell of arcuate form and of circular contour, with a length extended over an arc of 60°. It has a U-like section, the interior surface of peripheral portion 11 being relatively semi-flat to conform with the periphery of a conventional pneumatic tire 13 and closely fit on and against it. The side walls 12 of the boot are arcuately bent inwardly so as to resiliently bind against the tire and hug it tightly. The lower edges or rims 14 of the boot are slightly enlarged and outwardly curved to facilitate the placement of the boot on the tire, as well as to stiffen it. Also a strap slot 15 is provided in each wall near the lower edges for the insertion of a tightening strap 16, when a set of two boots is used. Only one strap is normally employed at a time and is placed on the hub-cap side of the wheel 17, holding the tire 13. The peripheral wall 11 of the shell is provided with a series of spaced openings 18 across it to provide an appreciable amount of longitudinal flexibility to the boot. The areas 19 in between the openings 18 are surmounted by knurled rectangular or cross-bands strips 20, extending across the shell transversely. The strips or cross-bands 20 project sufficiently beyond the periphery of the shell to provide a gripping or traction effect on the surface that the tire with the boot may be run on. The strips or cross-bands are preferably spaced on center lines equal to those of the openings and are less in width than the latter. This permits one boot to be staggered and surmounted on another and lock its openings with the strips of the other and fit closely thereto. Double or superposed booting is for occasions when snow or mud on the highway is deep enough to require it. The strap 16 is of conventional construction with a buckle to tighten and lock, and does not appear to require further detailing herein. The mounting of the boot on a tire is relatively easy. The expanded rims 14 of the boot are engaged on the tire, and facilitate the entrance of the latter into the boot, which is forced on by hand or foot pressure exerted by the user against it. The resiliency of the shell enables it to open enough to permit this and when the latter is in place to hold it securely. The holding strap 16 may not be needed when a single boot is mounted. When a set of two boots is used, the strap is considered desirable as it adds additional security. The straps are attached to the rims through the slots 15, before the boots are mounted and are tightened after the boots are in place. If there is too much resistance to the movement of the straps in the slots, due to the tightness of the boot, such may be reduced by providing a depression or embossing in the boot to take care of it, but ordinarily the resiliency of the tire body minimizes the effect.

While the boot is primarily intended for traction purposes, it can also be utilized as an emergency blow-out patch to hold and cover a smaller break in the wall of the tire. The boot is intended for manual placement on a tire. This can be facilitated by reducing the air-pressure of the tire. This also is the method usable when the boot is to be removed even if a tire iron may be used also. The strap 16 is a safeguard against loss of the boots should the tire become too "soft."

The type of traction boot described herein inherently includes features of being self-holding, relatively noiseless in use, long wearing qualities, neat and attractive in appearance, easy to install, effective in action; and adjustability in traction characteristics. All of these features distinguish the invention from previous developments in this art and make a practical adjunct to situations where snow, ice, mud, and hilly terrain are involved.

While but one form of the invention is illustrated, it is not desired to limit this application for Letters Patent to such form, as it is appreciated that other constructions can be designed and made that would use the same principles and come within the scope of the appended claim.

Having thus described the invention, what is claimed is:

A combined non-skid and traction boot adapted to fit over the side walls and periphery of a pneumatic tire, said boot consisting of a thin, unitary arcuate shell of rustless, spring-steel material, having a tread portion fitted over the periphery of the tire and continuous side walls depending from said tread portion and arcuately bent inwardly to resiliently engaging the opposite sides of said tire, the lower edges of said side walls being enlarged and curved outwardly to facilitate the placement of said device on said tire, the continuous side walls of said device being co-extensive with the tread portion thereof all along the length of said portion, said tread portion having transverse alternate, outwardly protruding cross strips and transverse slots provided therein, the medians of said strips and slots being equally spaced but the width of said strips being less than that of said slots, whereby when a plurality of boots are superposed on each other for added traction, the strips of the lowermost boot will be received and locked in the slots of the uppermost boot.

References Cited in the file of this patent
UNITED STATES PATENTS

| | | |
|---|---|---|
| 1,626,788 | Crawford | May 3, 1927 |
| 2,530,108 | Whichard | Nov. 14, 1950 |
| 2,679,882 | Rich | June 1, 1954 |